(12) United States Patent
Tsukamoto et al.

(10) Patent No.: US 10,323,743 B2
(45) Date of Patent: Jun. 18, 2019

(54) CONTROL DEVICE OF VEHICLE

(71) Applicants: TOYOTA JIDOSHA KABUSHIKI KAISHA, Toyota-shi, Aichi (JP); AISIN AW CO., LTD., Anjo-shi, Aichi (JP)

(72) Inventors: Norihiro Tsukamoto, Toyota (JP); Tomohiro Asami, Nisshin (JP); Keisuke Ota, Toyota (JP); Hiromasa Takai, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1 day.

(21) Appl. No.: 15/654,254

(22) Filed: Jul. 19, 2017

(65) Prior Publication Data

US 2018/0023690 A1    Jan. 25, 2018

(30) Foreign Application Priority Data

Jul. 25, 2016   (JP) .................................. 2016-145827

(51) Int. Cl.
    *F16H 61/00*     (2006.01)
    *B60W 30/00*    (2006.01)
    (Continued)

(52) U.S. Cl.
    CPC ............. *F16H 61/00* (2013.01); *B60W 30/00* (2013.01); *F16H 61/0437* (2013.01);
    (Continued)

(58) Field of Classification Search
    CPC .... F16H 61/00; F16H 61/0437; F16H 61/061; F16H 61/22; F16H 2061/0496;
    (Continued)

(56) References Cited

U.S. PATENT DOCUMENTS 7,775,934 B2 *   8/2010   Dickinson ............... F02D 37/02
                                                          477/102
8,177,685 B2 *   5/2012   Leibbrandt ............. F16D 48/08
                                                          477/109

(Continued)

FOREIGN PATENT DOCUMENTS

JP    2008-275001 A    11/2008
JP    2014-105741 A     6/2014
WO   2008/132591 A2    11/2008

*Primary Examiner* — David J Hlavka
(74) *Attorney, Agent, or Firm* — Oliff PLC

(57) ABSTRACT

A control device of a vehicle including a motor and a multi-speed type automatic transmission including a plurality of engagement devices, the control device engaging the engagement device to be engaged and releasing the engagement device to be released when the shift is determined, and controlling an engagement pressure of an engagement device to be released during an upshift in a driven state and a downshift in a driving state and controlling an engagement pressure of an engagement device to be engaged during an upshift in the driving state and a downshift in the driven state so as to control a rotation speed of a rotating element of the automatic transmission, the control device increasing an instruction pressure of the engagement device to a target surge pressure for a target surge time when switching is performed during the upshift and the downshift in the driven state, to the driving state.

3 Claims, 8 Drawing Sheets

(51) Int. Cl.
*F16H 61/22* (2006.01)
*F16H 61/06* (2006.01)
*F16H 61/04* (2006.01)
*F16H 59/18* (2006.01)

(52) U.S. Cl.
CPC ........... *F16H 61/061* (2013.01); *F16H 61/22* (2013.01); *F16D 2500/10412* (2013.01); *F16H 59/18* (2013.01); *F16H 2061/0096* (2013.01); *F16H 2061/0492* (2013.01); *F16H 2061/0496* (2013.01)

(58) Field of Classification Search
CPC ..... F16H 2061/0492; F16H 2061/0096; F16H 59/18; F16D 2500/10412; B60W 30/00
See application file for complete search history.

(56) References Cited

U.S. PATENT DOCUMENTS

| | | | |
|---|---|---|---|
| 8,515,634 B2* | 8/2013 | Kim | F16H 61/0213 701/36 |
| 2007/0117677 A1 | 5/2007 | Ayabe et al. | |

* cited by examiner

FIG.2
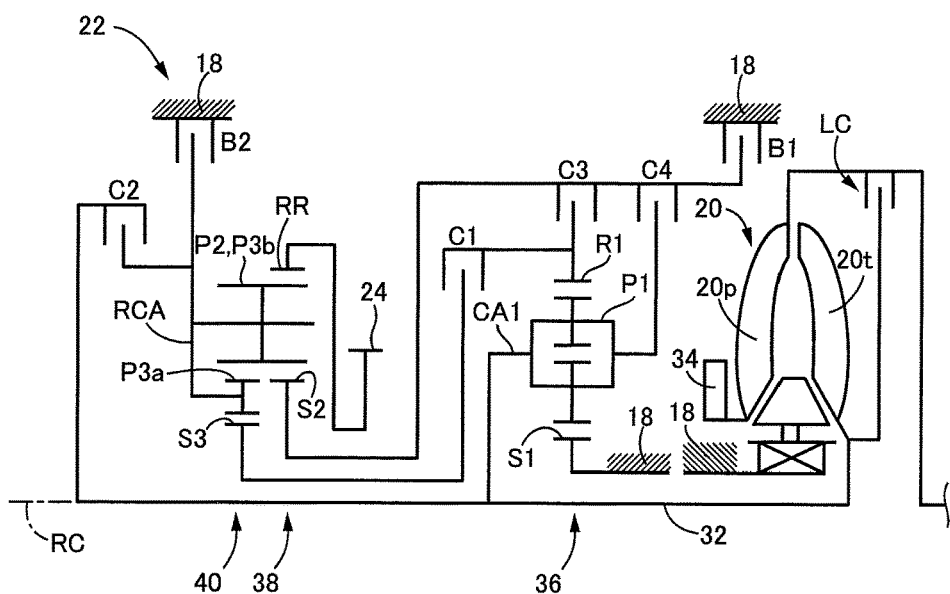
FIG.3
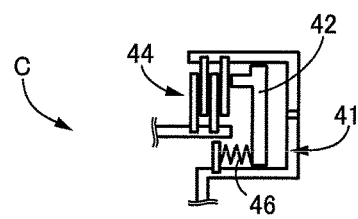
FIG.4
|  | C1 | C2 | C3 | C4 | B1 | B2 |
|---|---|---|---|---|---|---|
| 1st | ○ |  |  |  |  | ○ |
| 2nd | ○ |  |  |  | ○ |  |
| 3rd | ○ |  | ○ |  |  |  |
| 4th | ○ |  |  | ○ |  |  |
| 5th | ○ | ○ |  |  |  |  |
| 6th |  | ○ |  | ○ |  |  |
| 7th |  | ○ | ○ |  |  |  |
| 8th |  | ○ |  |  | ○ |  |
| Rev |  |  | ○ |  |  | ○ |
○:ENGAGEMENT    BLANK: RELEASE

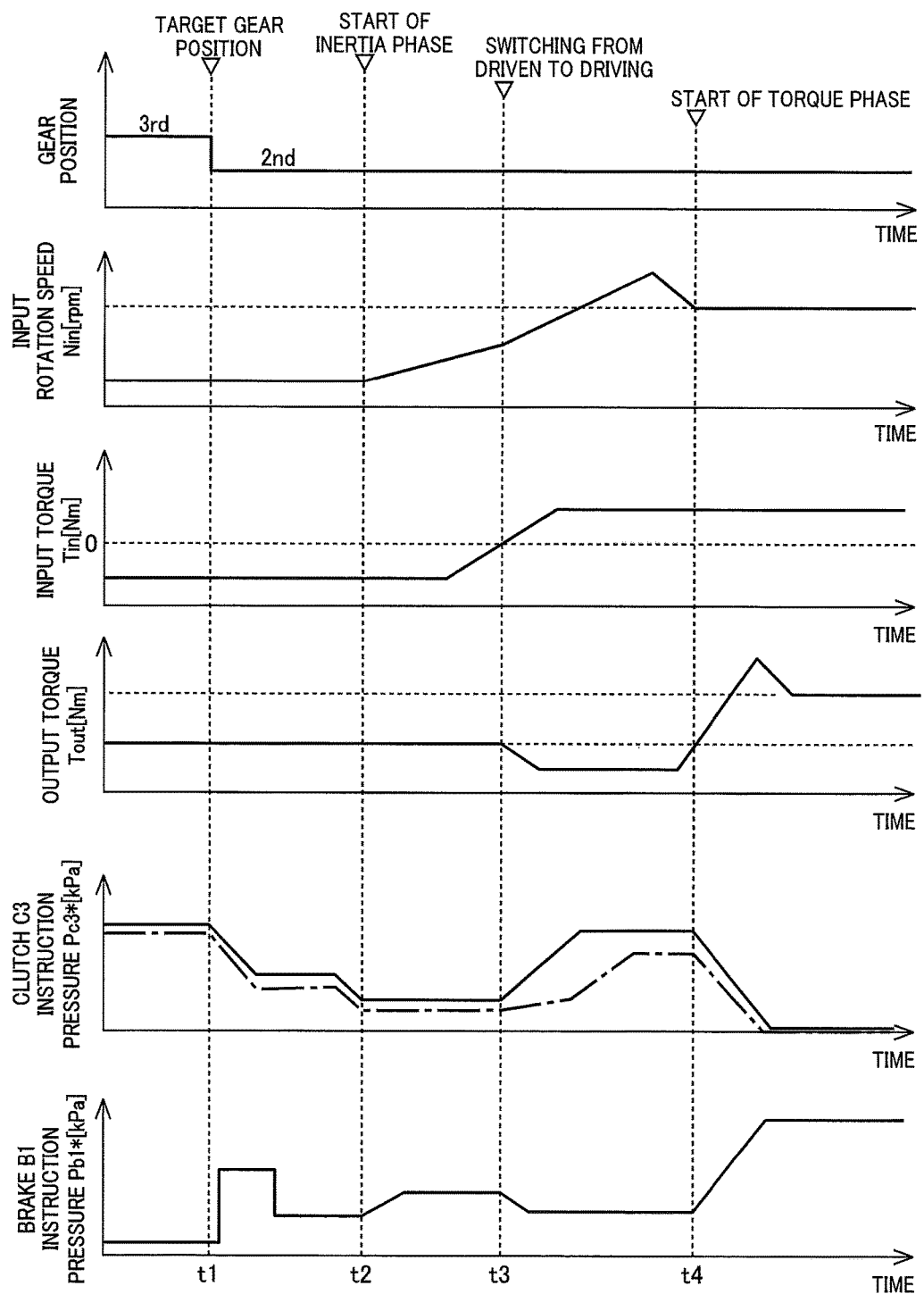

CONTROL DEVICE OF VEHICLE

INCORPORATION BY REFERENCE

The disclosure of Japanese Patent Application No. 2016-145827 filed on Jul. 25, 2016 including the specification, drawings and abstract is incorporated herein by reference in its entirety.

TECHNICAL FIELD

The present invention relates to a control device of a vehicle including a multi-speed type automatic transmission and, more particularly, to suppression of a racing of rotation speed and a shock during a shift of the automatic transmission.

BACKGROUND ART

A multi-speed type automatic transmission is well known that includes a plurality of engagement devices and that is shifted to each of a plurality of gear shift positions by switching an engagement state of the plurality of engagement devices. This corresponds to an automatic transmission described in Patent Document 1. Patent Document 1 discloses that when it is predicted that a power-on downshift is required as a next shift, a hydraulic pressure is supplied to an engagement-side engagement device to be engaged in the next shift for achieving a standby state immediately before starting the engagement in advance, specifically, a state in which a space is eliminated between a piston and an engagement element constituting the engagement-side engagement device and the engagement element does not yet have a torque capacity. By supplying the hydraulic pressure in advance to the engagement-side engagement device, a delay of the start of the next shift is prevented, and a drive force can be improved in responsiveness to a driver's operation.

PRIOR ART DOCUMENT

Patent Document

Patent Document 1: Japanese Laid-Open Patent Publication No. 2008-275001

SUMMARY OF THE INVENTION

Problem to be Solved by the Invention

In the automatic transmission of Patent Document 1, for example, when an accelerator pedal is depressed by a driver during a shift in a driven state in which the accelerator pedal is not depressed, so that the shift in the driven state is switched to a shift in a driving state, a racing of input rotation speed and a shock of the automatic transmission may occur due to a response delay of a release-side engagement device to be released during the shift or an engagement-side engagement device to be engaged during the shift.

The present invention was conceived in view of the situations and it is therefore an object of the present invention to provide a control device of a vehicle capable of suppressing a racing of input rotation speed and a shock of an automatic transmission occurring at the time of switching to a driving shift due to depression of an accelerator pedal etc. during a driven shift of the automatic transmission.

Solution to Problem

The object indicated above is achieved according to a first aspect of the present invention, which provides a control device of a vehicle including (a) a motor and a multi-speed type automatic transmission configured to include a plurality of engagement devices, the automatic transmission shifted to a plurality of gear positions by switching an engagement state of the plurality of engagement devices, the control device of the vehicle including a shift control portion engaging the engagement device to be engaged during a shift and releasing the engagement device to be released during the shift when the shift to a predetermined gear position is determined, (b) the shift control portion controlling an engagement hydraulic pressure of an engagement device to be released during the shift so as to control a rotation speed of a rotating element of the automatic transmission during an upshift in a driven state in which a drive torque is not output from the motor, and controlling an engagement hydraulic pressure of an engagement device to be engaged during the shift so as to control the rotation speed of the rotating element of the automatic transmission during an upshift in a driving state in which a drive torque is output from the motor, the shift control portion controlling the engagement hydraulic pressure of the engagement device to be engaged during the shift so as to control the rotation speed of the rotating element of the automatic transmission during a downshift in the driven state in which a drive torque is not output from the motor, and controlling the engagement hydraulic pressure of the engagement device to be released during the shift so as to control the rotation speed of the rotating element of the automatic transmission during a downshift in the driving state in which a drive torque is output from the motor, (c) the control device of a vehicle comprising: a hydraulic pressure surge control portion increasing an instruction pressure of the engagement device controlling the rotation speed of the rotating element of the automatic transmission to a predetermined target surge pressure for a target surge time when switching is performed during the upshift of the automatic transmission in the driven state in which a drive torque is not output from the motor, to the driving state in which a drive torque is output from the motor, (d) the hydraulic pressure surge control portion increasing an instruction pressure of the engagement device controlling the rotation speed of the rotating element of the automatic transmission to a predetermined target surge pressure for a target surge time when switching is performed during the downshift of the automatic transmission in the driven state in which a drive torque is not output from the motor, to the driving state in which a drive torque is output from the motor.

A second aspect of the present invention provides the control apparatus of a vehicle recited in the first aspect of the invention, wherein the magnitude of the target surge pressure and the target surge time are set based on a target torque of the motor.

A third aspect of the present invention provides the control apparatus of a vehicle recited in the first or second aspect of the invention, wherein the target surge time is adjusted based on a piston stroke end attainment degree estimated based on a time during which the instruction pressure of the engagement device subjected to the output of the target surge pressure is less than a preset piston stroke end pressure at which a space is eliminated between a piston and an engagement element constituting the engagement device and a time during which the instruction pressure is equal to or greater than the piston stroke end pressure.

Advantageous Effects of the Invention

According to the control device of a vehicle of the first aspect of the invention, when switching is performed to the driving state during the upshift in the driven state, an engagement device serving to control the rotation speed of the rotating element of the automatic transmission is changed so that the rotation speed of the rotating element of the automatic transmission is controlled by the engagement device, and in this case, the instruction pressure of the engagement device is increased to the predetermined target surge pressure for the target surge time and, therefore, the responsiveness of the engagement device is enhanced. Also in the case of switching to the driving state during the downshift in the driven state, an engagement device serving to control the rotation speed of the rotating element of the automatic transmission is changed so that the rotation speed of the rotating element of the automatic transmission is controlled by the engagement device, in this case, the instruction pressure of the engagement device is increased to the predetermined target surge pressure for the target surge time, so that the responsiveness of this engagement device is enhanced. This enables the suppression of the racing of the rotation speed of the rotating element and the shock due to the response delay of the engagement device.

According to the control device of a vehicle of the second aspect of the invention, since the magnitude of the target surge pressure and the target surge time are set based on the target torque of the motor, the target surge pressure and the target surge time are set to optimum values and the occurrence of the excessive surge pressure can be suppressed while ensuring the responsiveness of the engagement device.

According to the control device of a vehicle of the third aspect of the invention, since the piston stroke end attainment degree is estimated, and the target surge pressure and the target surge time are adjusted based on the hydraulic pressure required for achieving a state in which the space is eliminated between the piston and the engagement element from this attainment degree, the responsiveness of the engagement device can further be enhanced.

BRIEF DESCRIPTION OF DRAWINGS

FIG. 2 is a schematic for explaining an example of a torque converter and an automatic transmission.

FIG. 3 is a simplified cross-sectional view of a structure of an engagement device of FIG. 2.

FIG. 4 is an engagement operation table for establishing gear positions in the automatic transmission of FIG. 2.

FIG. 5 is a time chart for explaining behaviors during a downshift from a third speed gear position to a second speed gear position performed during deceleration running with an accelerator pedal turned off.

MODES FOR CARRYING OUT THE INVENTION

An example of the present invention will now be described in detail with reference to the drawings. In the following example, the figures are simplified or deformed as needed and portions are not necessarily precisely drawn in terms of dimension ratio, shape, etc.

EXAMPLE

Figure 1:
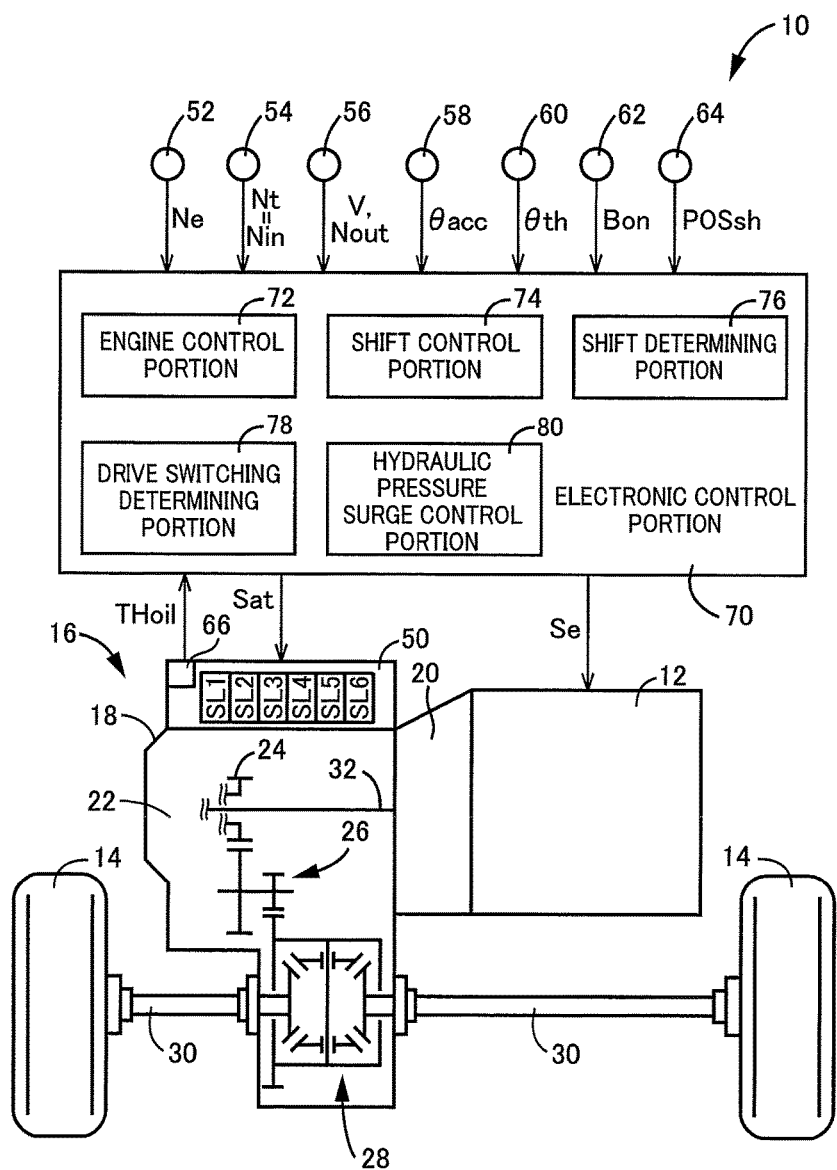
FIG. 1 is a diagram for explaining a general configuration of a vehicle to which the present invention is applied and is a diagram for explaining main portions of a control system for various controls in the vehicle.

FIG. 1 is a diagram for explaining a general configuration of a vehicle 10 to which the present invention is applied and is a diagram for explaining main portions of a control system for various controls in the vehicle 10. In FIG. 1, the vehicle 10 includes an engine 12, drive wheels 14, and a vehicle power transmission device 16 (hereinafter referred to as a power transmission device 16) disposed in a power transmission path between the engine 12 and the drive wheels 14. The power transmission device 16 includes, in a case 18 acting as a non-rotating member attached to a vehicle body, a torque converter 20, an automatic transmission 22, a reduction gear mechanism 26 coupled to a transmission output gear 24 that is an output rotating member of the automatic transmission 22, a differential gear (differential gear device) 28 coupled to the reduction gear mechanism 26, etc. The power transmission device 16 also includes a pair of drive shafts (axles) 30 etc. coupled to the differential gear 28. In the power transmission device 16, the power (synonymous with torque and force if not particularly distinguished) output from the engine 12 is transmitted sequentially through the torque converter 20, the automatic transmission 22, the reduction gear mechanism 26, the differential gear 28, the drive shaft 30, etc. to the driving wheels 14.

The engine 12 is a drive force source of the vehicle 10 and is a known internal combustion engine such as a gasoline engine and a diesel engine. In the engine 12, engine torque Te is controlled through control of an operational state such as an intake air amount, a fuel supply amount, and an ignition timing by an electronic control device 70 described later. The engine 12 corresponds to a motor of the present invention.

FIG. 2 is a schematic for explaining an example of the torque converter 20 and the automatic transmission 22. The torque converter 20, the automatic transmission 22, etc. are configured substantially symmetrically with respect to an axial center RC of a transmission input shaft 32 (input shaft 32) that is an input rotating member of the automatic transmission 22 and have lower halves from the axial center RC not shown in FIG. 2.

In FIG. 2, the torque converter 20 is disposed to rotate around the axial center RC in a power transmission path between the engine 12 and the automatic transmission 22 and is a fluid transmission device including a pump impeller 20p coupled to the engine 12, a turbine impeller 20t coupled to the input shaft 32, etc. The input shaft 32 also serves as a turbine shaft rotationally driven by the turbine impeller 20t. The power transmission device 16 also includes a lockup clutch LC capable of direct coupling between the pump impeller 20p and the turbine impeller 20t (i.e., between input/output rotating members of the torque converter 20). The power transmission device 16 also includes a mechanical oil pump 34 coupled to the pump impeller 20p. The oil pump 34 is rotationally driven by the engine 12 to generate (discharge) a hydraulic fluid pressure serving as a source pressure for providing a shift control of the automatic transmission 22 and supplying lubrication oil to portions of the power transmission path of the power transmission device 16. Therefore, the hydraulic fluid pumped up by the oil pump 34 is supplied as a source pressure of a hydraulic control circuit 50 (see FIG. 1) included in the vehicle 10.

The automatic transmission 22 is a multi-speed type automatic transmission constituting a portion of the power transmission path between the engine 12 and the drive wheels 14. The automatic transmission 22 is a planetary gear type multi-speed transmission having a double pinion type first planetary gear device 36 as well as a single pinion type second planetary gear device 38 and a double pinion type third planetary gear device 40 formed as a Ravigneaux type, on a coaxial line (on the axial center RC). The automatic transmission 22 includes a first clutch C1, a second clutch C2, a third clutch C3, a fourth clutch C4, a first brake B1, and a second brake B2 (hereinafter simply referred to as engagement devices C if not particularly distinguished). The first clutch C1 to the fourth clutch C4, the first brake B1, and the second brake B2 correspond to an engagement device of the present invention.

The first planetary gear device 36 includes a first sun gear S1, a plurality of pairs of first planetary gears P1 meshing with each other, a first carrier CA1 supporting the first planetary gear P1 such that the first planetary gear P1 is rotatable about its axis and an axis of the first planetary gear device, and a first ring gear R1 meshing via the first planetary gear P1 with the first sun gear S1. The second planetary gear device 38 includes a second sun gear S2, a second planetary gear P2, a carrier RCA supporting the second planetary gear P2 such that the second planetary gear P2 is rotatable about its axis and an axis of the second planetary gear device, and a ring gear RR meshing via the second planetary gear P2 with the second sun gear S2. The third planetary gear device 40 includes a third sun gear S3, a plurality of pairs of third planetary gears P3a, P3b meshing with each other, a carrier RCA supporting the third planetary gears P3a, P3b such that the third planetary gears P3a, P3b are rotatable about its axis and an axis of the third planetary gear device, and a ring gear RR meshing via the third planetary gears P3a, P3b with the third sun gear S3. In the second planetary gear device 38 and the third planetary gear device 40, the third planetary gear P3b and the second planetary gear P2 are commonalized, and the carriers are made up of the common carrier RCA while the ring gears are made up of the common ring gear RR, so that a so-called Ravigneaux type is achieved.

As shown in a simplified cross-sectional view of FIG. 3, the engagement devices C are hydraulic type friction engagement devices (clutches, brakes) each including a piston 42 (hydraulic piston) driven by a hydraulic actuator 41, a friction engagement element 44 (corresponding to an engagement element of the present invention) pressed by the piston 42, and a spring 46 urging the piston 42 in a direction away from the friction engagement element 44. The engagement devices C have respective torque capacities Tc changed in accordance with hydraulic pressures Pc output from solenoid valves in the hydraulic control circuit 50 and supplied into the hydraulic actuators 41, so that respective operation states (states such as engagement and release) of the engagement devices C are switched.

FIG. 3 shows a state in which a space is eliminated between the piston 42 and the friction engagement element 44 (a state in which the piston 42 and the friction engagement element 44 are in contact with each other) located at a position at which the torque capacity Tc of the engagement device C is zero, i.e., a state immediately before the engagement device C starts having the torque capacity Tc. The position of the piston 42 in this case is referred to as a piston stroke end position, and the hydraulic pressure in the hydraulic actuator 41 at this point is referred to as a piston stroke end pressure Pend. The piston stroke end pressure Pend is a value obtained in advance based on the specifications of the engagement device C (such as the rigidity of the spring 46).

In the automatic transmission 22, the first sun gear S1 is coupled to the case 18. The first carrier CA1 is coupled to the input shaft 32. The first carrier CA1 and the second sun gear S2 are selectively coupled via the fourth clutch C4. The first ring gear R1 and the third sun gear S3 are selectively coupled via the first clutch C1. The first ring gear R1 and the second sun gear S2 are selectively coupled via the third clutch C3. The second sun gear S2 is selectively coupled via the first brake B1 to the case 18. The carrier RCA is selectively coupled via the second clutch C2 to the input shaft 32. The carrier RCA is selectively coupled via the second brake B2 to the case 18. The ring gear RR is coupled to the transmission output gear 24.

The automatic transmission 22 has a plurality of gear positions (gear shift positions) different in gear ratio (speed change ratio) γ (=input rotation speed Nin/output rotation speed Nout) selectively established by controlling engagement and release of the engagement devices C by the electronic control device 70 described later in accordance with a driver's accelerator operation, a vehicle speed V, etc. For example, as shown in an engagement operation table in FIG. 4, the automatic transmission 22 has eight forward gear positions from a first speed gear position "1st" to an eighth speed gear position "8th" and a reverse gear position "Rev" such that the gear positions are selectively established. The input rotation speed Nin is the rotation speed of the input shaft 32 and the output rotation speed Nout is the rotation speed of the transmission output gear 24. The gear ratio γ of the automatic transmission 22 corresponding to each of the gear positions is appropriately defined by gear ratios (=the number of teeth of the sun gear/the number of teeth of the ring gear) ρ1, ρ2, and ρ3 of the first planetary gear device 36, the second planetary gear device 38, and the third planetary gear device 40. The gear ratio γ is the highest at the first speed gear position "1st" and decreases toward the higher vehicle speed side (the eighth speed gear position "8th" side).

The engagement operation table of FIG. 4 represents the relationship between the gear positions established in the automatic transmission 22 and the operation states of the engagement devices C, and "◯" and a blank indicate engagement and release of the engagement devices C, respectively. As shown in FIG. 4, among the forward gear positions, the first speed gear position "1st" is established by engagement of the first clutch C1 and the second brake B2. The second speed gear position "2nd" is established by engagement of the first clutch C1 and the first brake B1. The third speed gear position "3rd" is established by engagement of the first clutch C1 and the third clutch C3. The fourth speed gear position "4th" is established by engagement of the first clutch C1 and the fourth clutch C4. The fifth speed gear position "5th" is established by engagement of the first clutch C1 and the second clutch C2. The sixth speed gear position "6th" is established by engagement of the second clutch C2 and the fourth clutch C4. The seventh speed gear position "7th" is established by engagement of the second clutch C2 and the third clutch C3. The eighth speed gear position "8th" is established by engagement of the second clutch C2 and the first brake B1. The reverse gear position "Rev" is established by engagement of the third clutch C3 and the second brake B2. When the engagement devices C are all released, the automatic transmission 22 is brought into a neutral state in which no gear position is established (i.e., a neutral state in which power transmission is interrupted).

Returning to FIG. 1, the vehicle 10 includes the electronic control device 70 including a control device of the vehicle 10 related to the shift control of the automatic transmission 22, for example. Therefore, FIG. 1 is a diagram of an input/output system of the electronic control device 70 and is a functional block diagram for explaining a main portion of the control function by the electronic control device 70. The electronic control device 70 includes a so-called microcomputer including a CPU, a RAM, a ROM, and an I/O interface, for example, and the CPU executes signal processes in accordance with a program stored in advance in the ROM, while utilizing a temporary storage function of the RAM, to provide various controls of the vehicle 10. For example, the electronic control device 70 provides the output control of the engine 12, the shift control of the automatic transmission 22, etc., and is configured separately for the engine output control, the hydraulic control (the shift control), etc., as needed.

The electronic control device 70 is supplied with various signals (e.g., an engine rotation speed Ne, the input rotation speed Nin that is also the rotation speed of the turbine shaft (i.e., a turbine rotation speed Nt), the output rotation speed Nout corresponding to the vehicle speed V, an accelerator opening degree θacc that is an operation amount of an accelerator pedal, a throttle valve opening degree θth that is an opening degree of an electronic throttle valve, a brake-on Bon that is a signal indicative of a brake operation state when a driver operates a brake operation member for operating a wheel brake, a shift-lever operation position (shift position) POSsh such as "P", "R", "N", and "D", etc., and a hydraulic fluid temperature THoil that is a temperature of hydraulic fluid in the hydraulic control circuit 50) based on detection values from various sensors etc. disposed in on the vehicle 10 (e.g., an engine rotation speed sensor 52, an input rotation speed sensor 54, an output rotation speed sensor 56, an accelerator opening degree sensor 58, a throttle valve opening degree sensor 60, a brake switch 62, a shift position sensor 64, and an oil temperature sensor 66). The electronic control device 70 supplies various devices included in the vehicle 10 (e.g., the engine 12 and the hydraulic control circuit 50) with various command signals (e.g., an engine control command signal Se and a hydraulic pressure control command signal Sat). This hydraulic pressure control command signal Sat is a command signal (hydraulic pressure command value, instruction pressure) for driving the solenoid valves regulating the hydraulic pressures (i.e., engagement hydraulic pressures) supplied to the hydraulic actuators of the engagement devices C and is output to the hydraulic control circuit 50.

The hydraulic control circuit 50 includes a solenoid valve SL1 for regulating an engagement hydraulic pressure Pc1 (of the hydraulic actuator) of the first clutch C1, a solenoid valve SL2 for regulating an engagement hydraulic pressure Pc2 of the second clutch C2, a solenoid valve SL3 for regulating an engagement hydraulic pressure Pc3 of the third clutch C3, a solenoid valve SL4 for regulating an engagement hydraulic pressure Pc4 of the fourth clutch C4, a solenoid valve SL5 for regulating an engagement hydraulic pressure Pb1 of the first brake B1, and a solenoid valve SL6 for regulating an engagement hydraulic pressure Pb2 of the second brake B2. The solenoid valves SL1 to SL6 regulate the hydraulic pressures Pc (engagement hydraulic pressures) of the engagement devices C based on the hydraulic pressure control command signal Sat output from the electronic control device 70.

To implement a control function for various controls in the vehicle 10, the electronic control device 70 functionally includes an engine control means, i.e., an engine control portion 72, a shift control means, i.e., a shift control portion 74, a shift determining means, i.e., a shift determining portion 76, a drive switching determining means, i.e., a drive switching determining portion 78, and a hydraulic pressure surge control means, i.e., a hydraulic pressure surge control portion 80.

The engine control portion 72 applies the accelerator opening degree θacc and the vehicle speed V (synonymous with the output rotation speed Nout, etc.) to a relationship (e.g., a driving force map) obtained empirically or through design and stored in advance (i.e., predefined) to calculate a required drive force Fdem. The engine control portion 72 sets a target torque Te* at which the required drive force Fdem is acquired, in consideration of a transmission loss, an accessory load, the gear ratio γ of the automatic transmission 22, etc., and outputs the engine control command signal Se for providing the output control of the engine 12 to a throttle actuator, a fuel injection device, an ignition device, etc. such that the target torque Te* is acquired. The target torque Te* corresponds to a target torque of a motor of the present invention.

The shift control portion 74 uses a predefined relationship (shift map, shift diagram) to determine whether to provide a gear switching control switching the gear position of the automatic transmission 22, and thereby determines a shift of the automatic transmission 22. The shift control portion 74 applies a vehicle speed related value and a drive request amount to the shift map to determine the shift of the automatic transmission 22 (i.e., determine the gear position to be established in the automatic transmission 22). The shift control portion 74 outputs to the hydraulic control circuit 50 the hydraulic pressure control command signal Sat for engaging and/or releasing the engagement devices C involved in the shift of the automatic transmission 22 so as to establish the determined gear position.

The shift map is a predetermined relationship having shift lines for determining the shift of the automatic transmission 22 on two-dimensional coordinates having the vehicle speed related value and the drive request amount as variables. The shift lines in the shift map are upshift lines for determining an upshift and downshift lines for determining a downshift. The upshift lines and the downshift lines are each determined in advance between gear positions having a difference of one speed from each other in a plurality of gear positions. The shift lines are each used for determining whether the line is crossed by the actual vehicle speed related value on a line indicative of a certain drive request amount or whether the line is crossed by the actual drive request amount on a line indicative of a certain vehicle speed related value, i.e., whether the vehicle speed related value or the drive request amount has crossed a value (shift point) on the shift line at which a shift should be executed, and are each defined in advance as a series of the shift points. The vehicle speed related value is the vehicle speed V or a value related to the vehicle speed V and is, for example, the vehicle speed V, a wheel speed, or the output rotation speed Nout. The drive request amount is a value representative of a magnitude of a drive request from a driver to the vehicle 10 and is, for example, the above-described required drive force Fdem [N] or a required drive torque [Nm] and a required drive power [W] related to the required drive force Fdem [N]. The accelerator opening degree θacc [%], the throttle valve opening degree θth [%], the intake air amount [g/sec], etc. can simply be used as the drive request amount.

When determining a shift to a predetermined gear position of the automatic transmission 22, the shift control portion 74 performs a so-called clutch-to-clutch shift making a change in engagement of the engagement devices C involved in the shift of the automatic transmission 22 (i.e., engaging the engagement-side engagement device to be engaged during the shift and releasing the release-side engagement device to be released during the shift). For example, in the 2-to-3 upshift from the second speed gear position 2nd to the third speed gear position 3rd, a change in engagement is made between the first brake B1 and the third clutch C3 (i.e., the clutch-to-clutch shift is performed by releasing the first brake B1 and engaging the third clutch C3). For example, in a downshift from the third speed gear position 3rd to the second speed gear position 2nd, the clutch-to-clutch shift is performed by releasing the third clutch C3 and engaging the first brake B1. In this example, out of the engagement devices C to be changed in engagement at the time of the shift, an engagement device to be released is referred to as a release-side engagement device, and an engagement device to be engaged is referred to as an engagement-side engagement device. The hydraulic pressure control command signal Sat is a release-side instruction pressure for acquiring a torque capacity (clutch torque) of the release-side engagement device during the shift and an engagement-side instruction pressure for acquiring a torque capacity (clutch torque) of the engagement-side engagement device during the shift.

For example, in such a state that the accelerator pedal is not depressed, the drive torque is not output from the engine 12 and, therefore, an input torque Tin of the input shaft 32 is a torque (negative torque, negative value) in a direction of reducing the input rotation speed Nin. Hereinafter, a driving state refers to a state in which a drive torque (positive torque, positive value) is output from the engine 12 (i.e., a state in which the input torque Tin of the input shaft 32 has a positive value), and a driven state refers to a state in which a drive torque is not output from the engine 12 (i.e., a state in which the input torque Tin of the input shaft 32 has a negative value). In the case of the downshift, the input rotation speed Nin of the input shaft 32 is raised during the shift (during the inertia phase). In this way, when the change direction of the rotation speed of the input shaft 32 associated with the downshift (an input rotation speed increase direction) is opposite to the direction of the torque acting on the input shaft 32 (an input rotation speed decrease direction), the input rotation speed Nin of the input shaft 32 during the inertia phase is controlled by controlling the engagement hydraulic pressure of the engagement-side engagement device to be engaged during the shift (shift transition period). The input rotation speed Nin of the input shaft 32 corresponds to a rotation speed of a rotating element of the present invention.

On the other hand, when the accelerator pedal is depressed, a drive torque (positive torque) in a direction of increasing the input rotation speed Nin of the input shaft 32 is output from the engine 12, resulting in the driving state in which the input torque Tin of the input shaft 32 has a positive value. In this case, the change direction of the rotation speed of the input shaft 32 associated with the downshift (the input rotation speed increase direction) is the same as the direction of the input torque Tin applied to the input shaft 32 (the input rotation speed increase direction). During the downshift in the driving state in which the drive torque is output from the engine 12 so that the input torque Tin has a positive value, the input rotation speed Nin of the input shaft 32 during the inertia phase is controlled by controlling the engagement hydraulic pressure of the release-side engagement device to be released during the shift.

In the case of switching to the driving state in which the drive torque is output from the engine 12 so that the input torque Tin has a positive value due to depression of the accelerator pedal etc. during a downshift in the driven state in which the input torque Tin of the input shaft 32 has a negative value (hereinafter referred to as a driven downshift), the rotation speed control by the release-side engagement device of the input rotation speed Nin during the inertia phase is took the place of the rotation speed control by the engagement-side engagement device. However, during the inertia phase of the driven downshift, the engagement hydraulic pressure of the release-side engagement device is in a state of waiting at a pressure equal to or less than, or near, the piston stroke end pressure Pend at which the torque capacity becomes zero, so that a delay may occur in ensuring the torque capacity required for the rotation speed control. Therefore, a rise in the actual engagement hydraulic pressure of the release-side engagement device is delayed with respect to a rise in the engine torque and the control is provided while the torque capacity of the release-side engagement device cannot be ensured, which may cause a racing of the input rotation speed Nin or a shock. Hereinafter, a driving downshift refers to a downshift in the state (driving state) in which the drive torque in the direction to increasing the input rotation speed Nin of the input shaft 32 is output from the engine 12.

The above problem will be described with reference to a time chart shown in FIG. 5. In a state shown in FIG. 5, a downshift from the third speed gear position 3rd to the second speed gear position 2nd is started due to a decrease in the vehicle speed V during coasting with the accelerator pedal turned off, for example, and the accelerator pedal is depressed during the inertia phase. In other words, FIG. 5 shows a state of the vehicle when the driven downshift is switched to the driving downshift during the inertia phase. In FIG. 5, the horizontal axis indicates time, and the vertical axis corresponds to the gear position, the input rotation speed Nin, the input torque Tin, output torque Tout, an instruction pressure Pc3* of the third clutch C3 corresponding to the release-side engagement device, and an instruction pressure Pb1* of the first brake B1 corresponding to the engagement-side engagement device, in order from the top. Only for the third clutch C3, the engagement hydraulic pressure Pc3 (actual hydraulic pressure) indicated by a dashed-dotted line is shown with respect to the instruction pressure Pc3* indicated by a solid line.

During the coasting at the third speed gear position 3rd (before time t1), the drive torque to the input shaft 32 is not output from the engine 12, and the input torque Tin of the input shaft 32 has a negative value. When the downshift to the second speed gear position 2nd is determined at time t1 in this running state, the instruction pressure Pc3* of the third clutch C3 corresponding to the release-side engagement device is reduced to a predetermined pressure set in advance, is temporarily maintained at this predetermined pressure, and is then further reduced to a standby pressure at which the torque capacity of the third clutch C3 becomes zero (time t1 to time t2). On the other hand, in the first brake B1 corresponding to the engagement-side engagement device, the determination of the downshift leads to execution of a so-called quick fill temporarily increasing the instruction pressure Pb1* to a predetermined pressure set in advance so as to enhance the responsiveness of the engagement hydraulic pressure Pb1 (actual hydraulic pressure). The completion of the quick fill is followed by waiting at a standby pressure set in advance (time t1 to time t2).

When the inertia phase is started at time t2, the input rotation speed Nin increases, and the input rotation speed Nin is controlled through the hydraulic control of the first brake B1. Specifically, a feedback control of controlling the engagement hydraulic pressure Pb1 of the first brake B1 is provided such that the input rotation speed Nin is gradually increased toward a target input rotation speed Nin* calculated from a speed change ratio γ2 of the second speed gear position 2nd, which is the gear position to be established after the shift, and the output rotation speed Nout (time t2 to time t3). In this feedback control, a difference (=Nin*−Nin) between the target input rotation speed Nin* and the input rotation speed Nin detected as needed is used as a deviation ΔNin for calculating a feedback control amount, i.e., the instruction pressure Pb1* of the first brake B1 as needed.

When the accelerator pedal is depressed during this inertia phase, the input torque Tin is increased and switched to a positive value at time t3. Therefore, at time t3, the input torque Tin is switched from a negative value (negative torque) to a positive value (positive torque). In this case, the rotation speed control of the input rotation speed Nin is switched to the control through the engagement hydraulic pressure of the third clutch C3 corresponding to the release-side engagement device, and at time t3, the instruction pressure Pc3* of the third clutch C3 is raised. If the instruction pressure pc3* of the third clutch C3 at time t3 is less than the piston stroke end pressure Pend, at which a space is eliminated between the piston 42 and the friction engagement element 44 constituting the third clutch C3, for a prolonged time, the piston 42 and the friction engagement element 44 are dissociated from each other so that it becomes necessary to eliminate a space between the piston 42 and the friction engagement element 44. By returning the piston 42 to the position at which the space between the piston 42 and the friction engagement element 44 is eliminated in this way, the hydraulic responsiveness of the engagement hydraulic pressure Pc3 (actual hydraulic pressure) is deteriorated. Therefore, the responsiveness of the engagement hydraulic pressure Pc3 (actual hydraulic pressure) indicated by the dashed-dotted line is delayed with respect to the instruction pressure Pc3* of the third clutch C3 indicated by the solid line of FIG. 5.

When the deterioration occurs in the hydraulic responsiveness of the engagement hydraulic pressure Pc3 that is the actual hydraulic pressure corresponding to the instruction pressure Pc3* of the third clutch C3, the torque capacity of the third clutch C3 becomes insufficient, thus a drop of the output torque Tout transmitted to the transmission output gear 24 occurs and causes a feeling of lost drive force to a driver. Additionally, the insufficient torque capacity of the third clutch C3 makes it difficult to suppress an excessive increase in the input rotation speed Nin, causing a racing of the input rotation speed Nin such that the input rotation speed Nin temporarily becomes higher than the target rotation speed Nin*.

When the input rotation speed Nin is synchronized with the target rotation speed Nin* and the inertia phase is terminated at time t4, the instruction pressure Pb1* is raised to the hydraulic pressure at which the first brake B1 is completely engaged, and the instruction pressure Pc3* is lowered to zero so that the third clutch C3 is released. In this case, since the torque capacity of the first brake B1 increases after the racing of the input rotation speed Nin, the influence of the racing is transmitted to the output side, and a shock occurs due to variation of the output torque Tout. The phenomenon described above is not limited to the downshift and also occurs in the upshift.

During the upshift in the driven state in which the input torque Tin of the input shaft 32 has a negative value, the input rotation speed Nin of the input shaft 32 during the inertia phase is controlled by controlling the engagement hydraulic pressure of the release-side engagement device to be released during the shift and, during the upshift in the driving state in which the drive torque is output from the engine 12 so that the input torque Tin has a positive value, the input rotation speed Nin of the input shaft 32 during the inertia phase is controlled by controlling the engagement hydraulic pressure of the engagement-side engagement device to be engaged during the shift.

Therefore, in this example, when the torque (the input torque Tin) acting on the input shaft 32 during a shift is switched from a negative value (negative torque) to a positive value (positive torque), i.e., when the driven state is switched to the driving state, the hydraulic pressure surge control portion 80 described later is executed to suppress the racing of the input rotation speed Nin and the shock generated during the shift. A control method at the time of switching to the driving state during the shift will hereinafter be described in detail.

Returning to FIG. 1, when a shift to a predetermined gear position is determined based on the shift diagram, the shift determining portion 76 determines whether the shift is an upshift in the driven state (hereinafter referred to as a driven upshift) or a downshift in the driven state (a driven downshift). For example, when a shift to a predetermined gear position is determined, the shift determining portion 76 determines that the shift is the upshift if the predetermined gear position is a gear position on the higher speed side than the current gear position, and determines that the shift is the downshift if the predetermined gear position is a gear position on the lower speed side than the current gear position.

Additionally, when the input torque Tin of the input shaft 32 has a negative value, the shift determining portion 76 determines that the state is "driven" (the driven state). When the input torque Tin has a positive value, the shift determining portion 76 determines that the state is "driving" (the driving state).

The shift determining portion 76 calculates the input torque Tin by using a torque map (not shown) obtained and stored in advance for calculating the input torque Tin of the input shaft 32, and determines that the shift is the driven upshift when the calculated input torque Tin has a negative value and the shift is an upshift, or determines that the shift is the driven downshift when the calculated input torque Tin has a negative value and the shift is a downshift. The torque map is made up of various parameters related to the input torque Tin including the accelerator opening degree θacc and the vehicle speed V (the output rotation speed Nout), for example, and the input torque Tin is calculated by applying the various parameters to the torque map. The torque map is a known technique and therefore will not be described. Hereinafter, an upshift in the driving state will be referred to as a driving upshift and a downshift in the driving state will be referred to as a driving downshift.

The drive switching determining portion 78 determines whether switching is performed from the driven state in which the input torque Tin of the input shaft 32 has a negative value, to the driving state in which the input torque Tin has a positive value. The drive switching determining portion 78 determines the switching from the driven state ("driven") to the driving state ("driving") based on, for example, whether the input torque Tin exceeds a predetermined value (zero in this example) set in advance during the shift. During the driven downshift, when the switching from the driven state to the driving state is determined by the drive switching determining portion 78, the driven downshift is switched to the driving downshift. During the driven upshift, when the switching from the driven state to the driving state is determined by the drive switching determining portion 78, the driven upshift is switched to the driving upshift.

In the driven downshift, the input rotation speed Nin during the inertia phase is controlled by the engagement-side engagement device; however, after switching to the driving downshift, the rotation speed control of the input rotation speed Nin is changed to be executed with the release-side engagement device. This release-side engagement device corresponds to an engagement device controlling a rotating element of an automatic transmission of the present invention. In the driven upshift, the input rotation speed Nin during the inertia phase is controlled by the release-side engagement device; however, after switching to the driving upshift, the rotation speed control of the input rotation speed Nin is changed to be executed with the engagement-side engagement device. This engagement-side engagement device corresponds to an engagement device controlling a rotating element of an automatic transmission of the present invention.

As described above, for example, when the driven downshift is switched to the driving downshift, the release-side engagement device is in a state of waiting at or below the piston stroke end pressure Pend at which the torque capacity becomes zero and, if the piston 42 and the friction engagement element 44 are dissociated from each other, the hydraulic responsiveness of the release-side engagement device deteriorates, making it difficult to promptly ensure the torque capacity of the release-side engagement device. When the driven upshift is switched to the driving upshift, the engagement-side engagement device is in a state of waiting at or below the piston stroke end pressure Pend at which the torque capacity of the engagement-side engagement device becomes zero and, if the piston 42 and the friction engagement element 44 are dissociated from each other, the hydraulic responsiveness of the engagement-side engagement device deteriorates, making it difficult to promptly ensure the torque capacity of the engagement-side engagement device.

To eliminate this difficulty, if the drive switching determining portion 78 determines that switching is performed from the driven state to the driving state during a shift, the hydraulic pressure surge control portion 80 is executed. When it is determined that switching is performed from the driven state to the driving state during a shift, to improve the responsiveness of the engagement hydraulic pressure of the engagement device controlling the input rotation speed Nin after the switching, the hydraulic pressure surge control portion 80 sets a target surge pressure Psg output as an instruction pressure of the engagement hydraulic pressure of the engagement device controlling the input rotation speed Nin after the switching and a target surge time T that is an output time of the target surge pressure Psg, and outputs a command to output the target surge pressure Psg for the target surge time T. The target surge pressure Psg is set to a hydraulic pressure sufficiently higher than the piston stroke end pressure Pend.

The hydraulic pressure surge control portion 80 sets the magnitude of the target surge pressure Psg and the target surge time T based on the target torque Te* of the engine 12. The hydraulic pressure surge control portion 80 stores a relationship map (not shown) made up of, for example, the accelerator opening degree θacc and the engine rotation speed Ne for obtaining the target torque Te* of the engine 12, and calculates the target torque Te* by applying the accelerator opening degree θacc and the engine rotation speed Ne detected as needed to this relationship map.

Figure 6A:
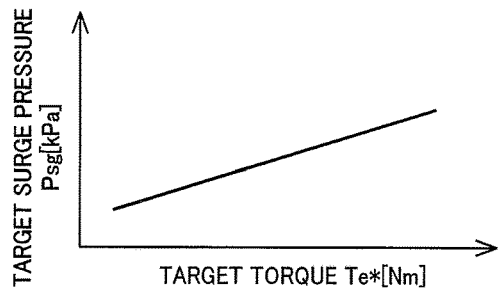
FIGS. 6A and 6B are maps using a target torque as a parameter for obtaining a surge pressure and an output time.
Figure 6B:
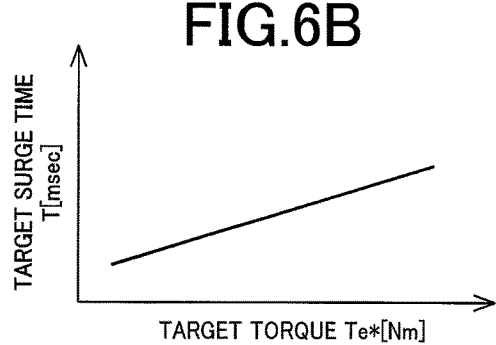

The hydraulic pressure surge control portion 80 stores respective maps using the target torque Te* as a parameter for obtaining the target surge pressure Psg and the target surge time T as shown in FIGS. 6A and 6B, for example, and determines the target surge pressure Psg and the target surge time T by applying the calculated target torque Te* to these maps. The maps are obtained in advance from experiments or analysis and set as shown in FIGS. 6A and 6B such that the target surge pressure Psg is made higher as the target torque Te* becomes larger and that the target surge time T is made longer as the target torque Te* becomes larger. With these maps, the target surge pressure Psg and the target surge time T are optimally set in accordance with the target torque Te*.

If the piston 42 of the engagement device is at the piston stroke end position, i.e., the position at which the space is eliminated between the piston 42 and the friction engagement element 44 (see FIG. 3) when the switching from the driven state to the driving state is performed during the shift (during the inertia phase), it is not necessary to consider the response delay of the hydraulic pressure of the engagement device, and the progress of the inertia phase may rather be hindered by the output of the target surge pressure Psg in a state in which the space is eliminated between the piston 42 and the friction engagement element 44. Additionally, the dissociation between the piston 42 and the friction engagement element 44 is larger, the movement amount of the piston 42 becomes larger, so that the deterioration of the hydraulic responsiveness becomes notable, and the racing of the input rotation speed Nin easily occurs. Therefore, the hydraulic pressure surge control portion 80 estimates a piston stroke end attainment degree S ($0 \leq S \leq 1.0$) representative of a degree of attainment of the piston 42 to the piston stroke end position, based on a piston return time Trt described later, and corrects (adjusts) the target surge time T obtained from the target torque Te*, based on this piston stroke end attainment degree S (hereinafter, the attainment degree S). The attainment degree S is set to 1.0 when the piston 42 is at the piston stroke end position (the amount of dissociation is zero), and has the value made smaller as the piston 42 moves away from the friction engagement element 44.

The piston return time Trt is a parameter for estimating the attainment degree S and, when the piston return time Trt is zero, the attainment degree S is 1.0, i.e., it is estimated that the piston 42 is at the piston stroke end position (the position at which the space is eliminated between the piston 42 and the friction engagement element 44). It is also estimated that as the piston return time Trt becomes larger, the attainment degree S becomes smaller, i.e., the amount of dissociation is larger between the piston 42 and the friction engagement element 44.

The piston return time Trt is obtained by measuring the time during which the instruction pressure of the engagement device is less than the piston stroke end pressure Pend and the time during which the instruction pressure is equal to or greater than the piston stroke end pressure Pend. The piston return time Trt is calculated by integrating the time (the period) when the instruction pressure of the engagement device is less than the piston stroke end pressure Pend to increase, and by subtracting the time (the period) when the engagement hydraulic pressure of the engagement device is equal to or greater than the piston stroke end pressure Pend to decrease. The piston return time Trt has the lower limit value set to zero. Therefore, the piston return time Trt is more increased while the instruction pressure is less than the piston stroke end pressure Pend for a longer period, and the piston return time Trt is more reduced while the instruction pressure is not less than the piston stroke end pressure Pend for a longer time. When the time of the instruction pressure equal to or greater than the piston stroke end pressure Pend becomes longer than the time of the instruction pressure less than the piston stroke end pressure Pend, the piston return time Trt becomes zero. In this case, it is estimated that the attainment degree S is 1.0, i.e., the piston 42 is at the piston stroke end position.

When the time of the instruction pressure less than the piston stroke end pressure Pend becomes longer than the time of the instruction pressure equal to or greater than the piston stroke end pressure Pend, the piston return time Trt becomes larger than zero. In this case, it is estimated that the piston 42 has not reached the piston stroke end position. It is also estimated that when the piston return time Trt is larger, the amount of dissociation becomes larger between the piston 42 and the engagement element. When the instruction pressure becomes less than the piston stroke end pressure Pend, the piston 42 moves to the side away from the friction engagement element 44. Therefore, it is estimated that when the instruction pressure is less than the piston stroke end pressure Pend for a longer time, the attainment degree S becomes lower.

The piston return time Trt is set (reset) to zero while the engagement device is completely released, i.e., while the instruction pressure is zero. Also when the target surge pressure Psg is output, the piston return time Trt is set (reset) to zero.

Figure 7:
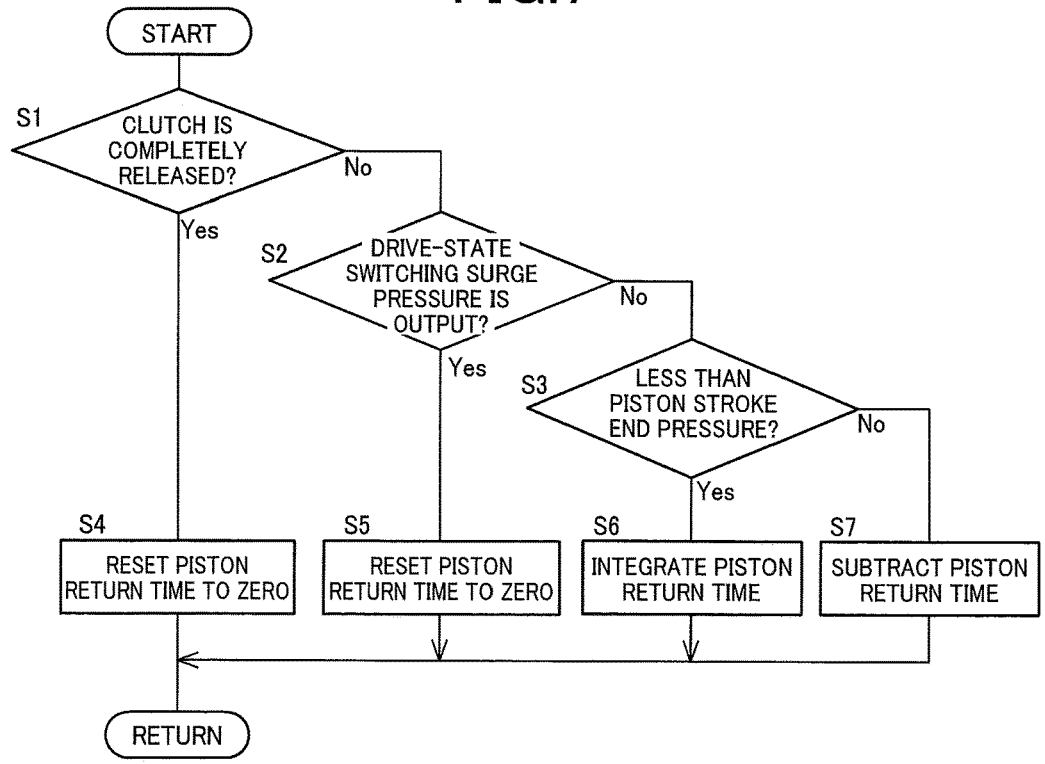
FIG. 7 is a flowchart for obtaining a piston return time.

FIG. 7 shows a flowchart for obtaining the piston return time Trt corresponding to the control function of the hydraulic pressure surge control portion 80 based on the above description. This flowchart is executed during running of the vehicle. At step S1 (hereinafter, step is omitted), it is determined whether the engagement device is in a completely released state, i.e., whether the instruction pressure of the engagement device is zero. If the engagement device is in the completely released state, S1 is affirmative, and the return time Trt is set (reset) to zero at S4.

When the engagement device is not in the completely released state, S1 is negative and it is determined whether the target surge pressure Psg is output. If the target surge pressure Psg is output, S2 is affirmative, and the return time Trt is set (reset) to zero at S5. If the target surge pressure Psg is not output, S2 is negative and it is determined at S3 whether the instruction pressure of the engagement device is less than the piston stroke end pressure Pend. If the instruction pressure is less than the piston stroke end pressure Pend, S3 is affirmative and the piston return time Trt is calculated by integrating the time. On the other hand, if the instruction pressure is equal to or greater than the piston stroke end pressure Pend, S3 is negative, and the piston return time Trt is subtracted at S7. The piston return time Trt is measured based on the flowchart described above.

Figure 8:
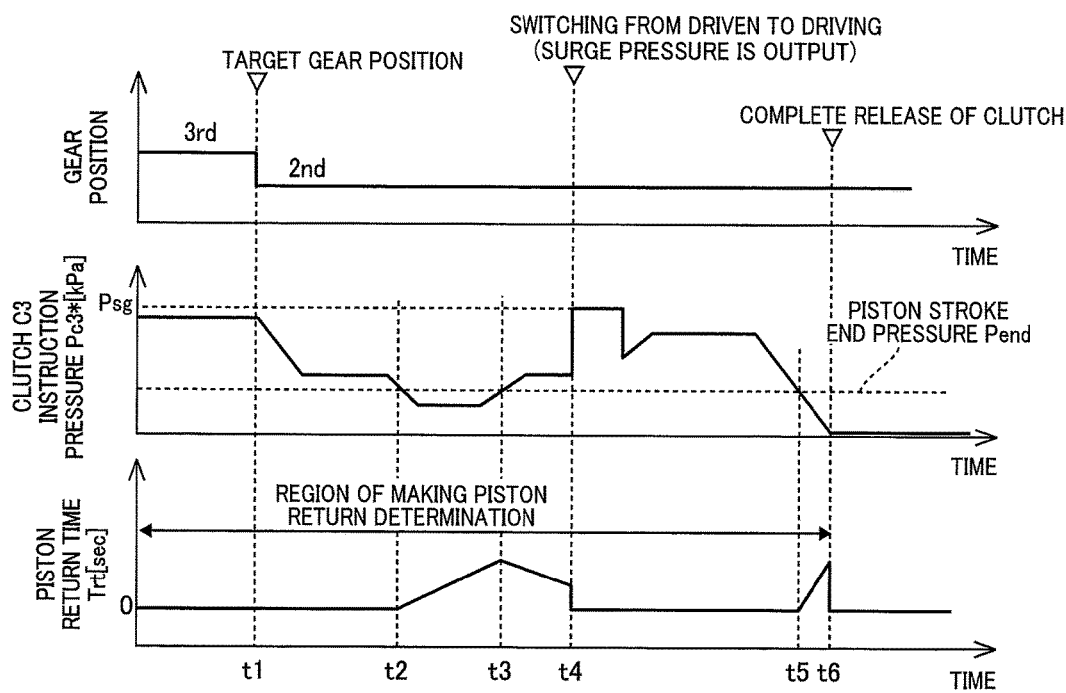
FIG. 8 is a time chart of the piston return time measured based on the flowchart of FIG. 7.

FIG. 8 is a time chart of the piston return time Trt measured based on the flowchart of FIG. 7. The time chart of FIG. 7 shows a downshift from the third speed gear position 3rd to the second speed gear position 2nd as an example.

Before time t1, since the vehicle is running at the third speed gear position 3rd and the instruction pressure Pc3* of the third clutch C3 in this case is higher than the piston stroke end pressure Pend, the piston return time Trt is subtracted; however, because the lower limit value of the piston return time Trt is zero, the piston return time Trt before time t1 is zero. At time t1, the downshift to the second speed gear position 2nd is started, so that a decrease in the instruction pressure Pc3* is started. At time t2, the instruction pressure Pc3* reaches the piston stroke end pressure Pend, and the instruction pressure Pc3* is less than the piston stroke end pressure Pend between time t2 and time t3. At this point, the piston return time Trt is integrated so that the piston return time trt increases. At time t3, the instruction pressure Pc3* returns to the piston stroke end pressure Pend and, since the instruction pressure Pc3* is higher than the piston stroke end pressure Pend after time t3, the piston return time Trt is subtracted so that the piston return time Trt decreases after time t3.

At time t4, the target surge pressure Psg is output, and the piston return time Trt is set (reset) to zero. The target surge pressure Psg and the target surge time T are corrected based on the piston return time Trt at time t4. Since the instruction pressure Pc3* is equal to or greater than the piston stroke end pressure Pend between time t4 and time t5, the piston return time Trt is maintained at the lower limit value of zero. After time t5, the instruction pressure Pc3* becomes less than the piston stroke end pressure Pend so that the return time Trt is integrated and increased, and at time t6, since the instruction pressure Pc3* is zero, i.e., the third clutch C3 is completely released, the piston return time Trt is set (reset) to zero. In the above description, the downshift from the third speed gear position 3rd to the second speed gear position 2nd is taken as an example; however, even in the case of other downshifts and upshifts, the attainment degree S is estimated by measuring the piston return time Trt, and the target surge time T is corrected.

The hydraulic pressure surge control portion 80 corrects the target surge pressure Psg and the target surge time T based on the piston return time Trt at the time point of switching from the driven state to the driving state. When the piston return time Trt is zero, the hydraulic pressure surge control portion 80 corrects the target surge time T to zero. Therefore, the target surge pressure Psg is not output. This is because when the piston return time Trt is zero, it is estimated that the attainment degree S is 1.0, i.e., the piston 42 is located at the piston stroke end position, and therefore, it is determined that even if the target surge pressure Psg is not output, a response delay does not occur in the hydraulic pressure. Additionally, the hydraulic pressure surge control portion 80 corrects the target surge time T toward the increasing side as the piston return time Trt becomes longer. This is because it is estimated that as the piston return time Trt becomes longer, the attainment degree S is a lower value, i.e., an amount of dissociation is larger between the piston 42 and the friction engagement element 44, and it is necessary to enhance the responsiveness of the hydraulic pressure.

Figure 9:
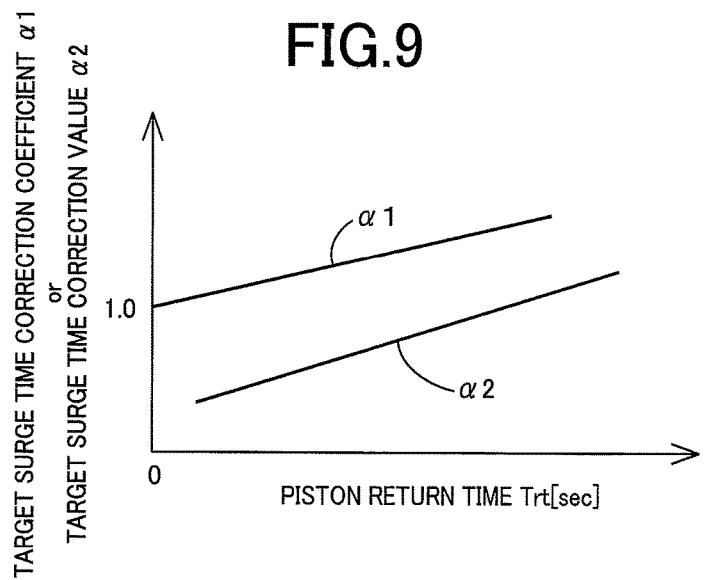
FIG. 9 is a surge pressure correction map using the piston return time as a parameter for obtaining a surge pressure correction coefficient or a surge pressure correction value of the surge pressure.

The hydraulic pressure surge control portion 80 stores a target surge time correction map using the piston return time Trt as a parameter for obtaining a target surge time correction coefficient α1 or a target surge time correction value α2 for the target surge time T as shown in FIG. 9, for example, and corrects the target surge time T by multiplying the target surge time T set based on the target torque Te* by the correction coefficient α1 obtained from the target surge time correction map or by adding the correction value α2 thereto. The target surge time T is corrected in this way, so that the target surge time T has an optimum value with the attainment degree S taken into account.

When determining that the switching to the driving state is performed during the downshift in the driven state, the hydraulic pressure surge control portion 80 sets the target surge pressure Psg as the instruction pressure output after the switching to the driving state from the release-side engagement device to be released during the shift (providing the rotation speed control of the input rotation speed Nin after the switching) along with the target surge time T, and outputs to the hydraulic control circuit 50 a command to output the target surge pressure Psg for the target surge time T. Because of the output of this target surge pressure, the piston 42 of the engagement device promptly moves to the piston stroke end position, and the engagement hydraulic pressure rapidly rises with respect to the instruction pressure, so that the deterioration in the responsiveness of the hydraulic pressure is suppressed.

Description will hereinafter be made of the shift control in the case of switching to the driving downshift during the driven downshift by taking the downshift from the third speed gear position 3rd to the second speed gear position 2nd as an example. In the downshift from the third speed gear position 3rd to the second speed gear position 2nd, the third clutch C3 is released and the first brake B1 is engaged. Therefore, the third clutch C3 corresponds to the release-side engagement device and the first brake B1 corresponds to the engagement-side engagement device.

Figure 10:
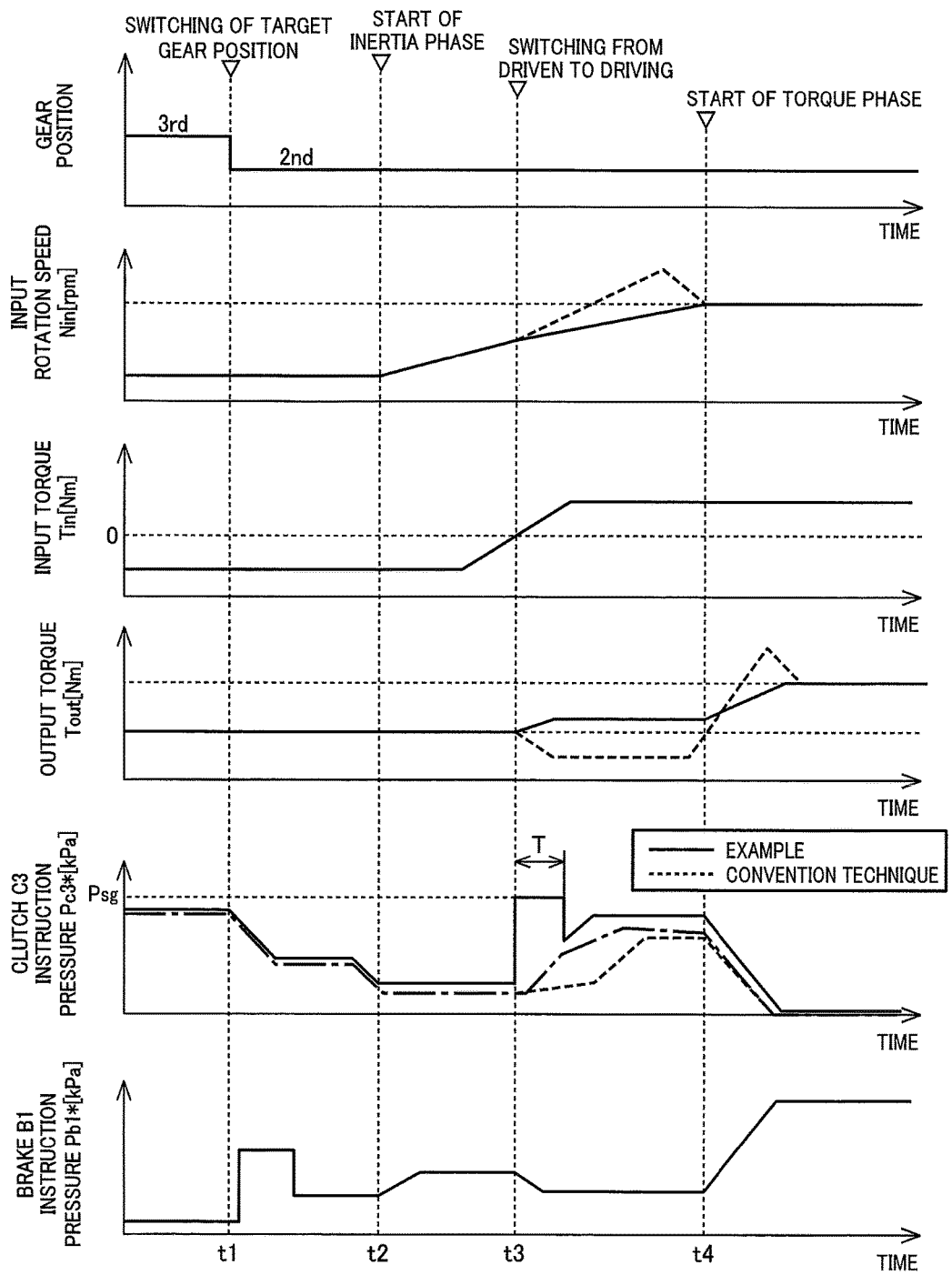
FIG. 10 is a time chart of an operation result when switching to a driving downshift is performed during a driven downshift in which a gear position is shifted from the third speed gear position to the second speed gear position.

FIG. 10 is a time chart at the time of switching to the driving downshift during the inertia phase of the driven downshift from the third speed gear position 3rd to the second speed gear position 2nd. The horizontal axis and the vertical axis of FIG. 10 are the same as those of FIG. 5 described above and therefore will not be described. When the downshift from the third speed gear position 3rd to the second speed gear position 2nd is determined at time t1 during coasting at the third speed gear position 3rd (during running with the accelerator pedal turned off), the clutch-to-clutch control is started for releasing the third clutch C3 and engaging the first brake B1.

Describing the control after time t1, the instruction pressure Pc3* of the third clutch C3 is reduced to a predetermined pressure set in advance, is temporarily maintained at the predetermined pressure, and is then further reduced to a standby pressure at which the torque capacity of the third clutch C3 becomes zero (time t1 to time t2). On the other hand, in the first brake B1, the determination of the downshift at time t1 leads to execution of the quick fill temporarily increasing the instruction pressure Pb1* to a predetermined pressure set in advance so as to enhance the responsiveness of the engagement hydraulic pressure Pb1. The completion of the quick fill is followed by waiting at a standby pressure set in advance (time t1 to time t2).

When the inertia phase is started at time t2, the input rotation speed Nin starts increasing. At this point, the input rotation speed Nin is controlled by the first brake B1. Specifically, a feedback control is provided by calculating and outputting a feedback control amount, i.e., the instruction pressure Pb1* of the first brake B1, by using as the deviation ΔNin a difference (=Nin*−Nin) between the target input rotation speed Nin* and the input rotation speed Nin detected as needed such that the input rotation speed Nin is gradually increased toward the target input rotation speed Nin* calculated from the speed change ratio γ2 of the second speed gear position 2nd, which is the gear position after the shift, and the output rotation speed Nout (time t2 to time t3). On the other hand, the third clutch C3 is maintained at the standby pressure equal to or less than the piston stroke end pressure Pend at which the torque capacity becomes zero (time t2 to time t3).

When the accelerator pedal is depressed during the inertia phase between time t2 and time t4, the input torque Tin is increased and the input torque Tin is switched from a negative value to a positive value at time t3. Therefore, at time t3, the driven state is switched to the driving state. When the input torque Tin is switched from a negative value to a positive value, the rotation speed control of the input rotation speed Nin is switched to the control by the third clutch C3 that is the release-side engagement device.

In this case, although a torque capacity enabling the provision of the rotation speed control is required in the third clutch C3, since the instruction pressure Pc3* of the third clutch C3 is equal to or less than the piston stroke end pressure Pend, the torque capacity is zero, and the piston 42 and the friction engagement element 44 may be dissociated from each other. In this regard, in this example, when the drive switching determining portion 78 determines at time t3 that switching is performed from the driven state to the driving state, the hydraulic pressure surge control portion 80 is executed to set the optimum target surge pressure Psg and target surge time T, and the target surge pressure Psg as indicated by a solid line is output (increased) as the instruction pressure Pc3* of the third clutch C3 for the target surge time T. Because of the output of the target surge pressure Psg, the hydraulic pressure responsiveness is improved by promptly eliminating the space between the piston 42 and the friction engagement element 44, so that the rise in the engagement hydraulic pressure Pc3 (actual hydraulic pressure) indicated by a dashed-dotted line is advanced as compared to the rise in the conventional engagement hydraulic pressure Pc3 (actual hydraulic pressure) indicated by a broken line. Therefore, since the rise in the torque capacity of the third clutch C3 is also advanced, the torque capacity required for the rotation speed control of the input rotation speed Nin is promptly ensured. While the input rotation speed Nin is controlled by the third clutch C3 after time t3, the engagement hydraulic pressure Pb1 of the first brake B1 is kept on standby at a value near the piston stroke end pressure Pend and maintained at the hydraulic pressure until the inertia phase ends.

When the output time of the target surge pressure Psg reaches the target surge time T, the normal feedback control is restored. Specifically, a feedback control is provided by calculating and outputting the feedback control amount, i.e., the instruction pressure Pc3* of the third clutch C3, by using as the deviation ΔNin a difference (=Nin*−Nin) between the target input rotation speed Nin* and the input rotation speed Nin detected as needed such that the input rotation speed Nin is gradually increased toward the target input rotation speed Nin* calculated from the speed change ratio γ2 of the second speed gear position 2nd, which is the gear position after the shift, and the output rotation speed Nout (time t3 to time t4).

As described above, since the target surge pressure Psg is output as the instruction pressure Pc3* of the third clutch C3 at time t3, the hydraulic responsiveness is improved by promptly eliminating the space between the piston 42 and the friction engagement element 44 of the third clutch C3, and the third clutch C3 can quickly have the torque capacity required for the rotation speed control. Therefore, after time t3, the input rotation speed Nin can be changed to gradually increase toward the target input rotation speed Nin* as indicated by a solid line through the rotation speed control by the third clutch C3. This enables the suppression of the racing of the input rotation speed Nin conventionally generated due to an insufficient torque capacity of the third clutch C3 as indicated by a broken line. Additionally, since the torque capacity of the third clutch C3 is promptly ensured, the output torque Tout does not drop after time t3, and this enables the suppression of the feeling of lost drive force conventionally generated due to the drop of the output torque Tout as indicated by a broken line.

At time t4, the end of the inertia phase is determined, and the instruction pressure Pb1* of the first brake B1 is raised to a predetermined complete engagement hydraulic pressure, while the instruction pressure Pc3* of the third clutch C3 is lowered to zero. In this example, since the racing of the input rotation speed Nin occurring during the inertia phase is suppressed, variation (i.e., shock) of the output torque Tout due to the racing as indicated by the broken line is restrained. Although the downshift from the third speed gear position 3rd to the second speed gear position 2nd is described as an example in the above description, the same control is provided even in a downshift to other gear shift positions.

The control in the case of switching to the driving upshift during the driven upshift will be described. When the drive switching determining portion 78 determines that the switching to the driving state is performed during the upshift in the driven state, the hydraulic pressure surge control portion 80 sets the target surge pressure Psg as the instruction pressure output after the switching to the driving state from the engagement-side engagement device to be engaged during the shift (providing the rotation speed control of the input rotation speed Nin after the switching) along with the target surge time T, and outputs to the hydraulic control circuit 50 a command to output the target surge pressure Psg for the target surge time T. The shift control during the upshift will hereinafter be described by taking an upshift from the second speed gear position 2nd to the third speed gear position 3rd as an example. In the upshift from the second speed gear position 2nd to the third speed gear position 3rd, the third clutch C3 is engaged and the first brake B1 is released. Therefore, the third clutch C3 corresponds to the engagement-side engagement device and the first brake B1 corresponds to the release-side engagement device.

Figure 11:
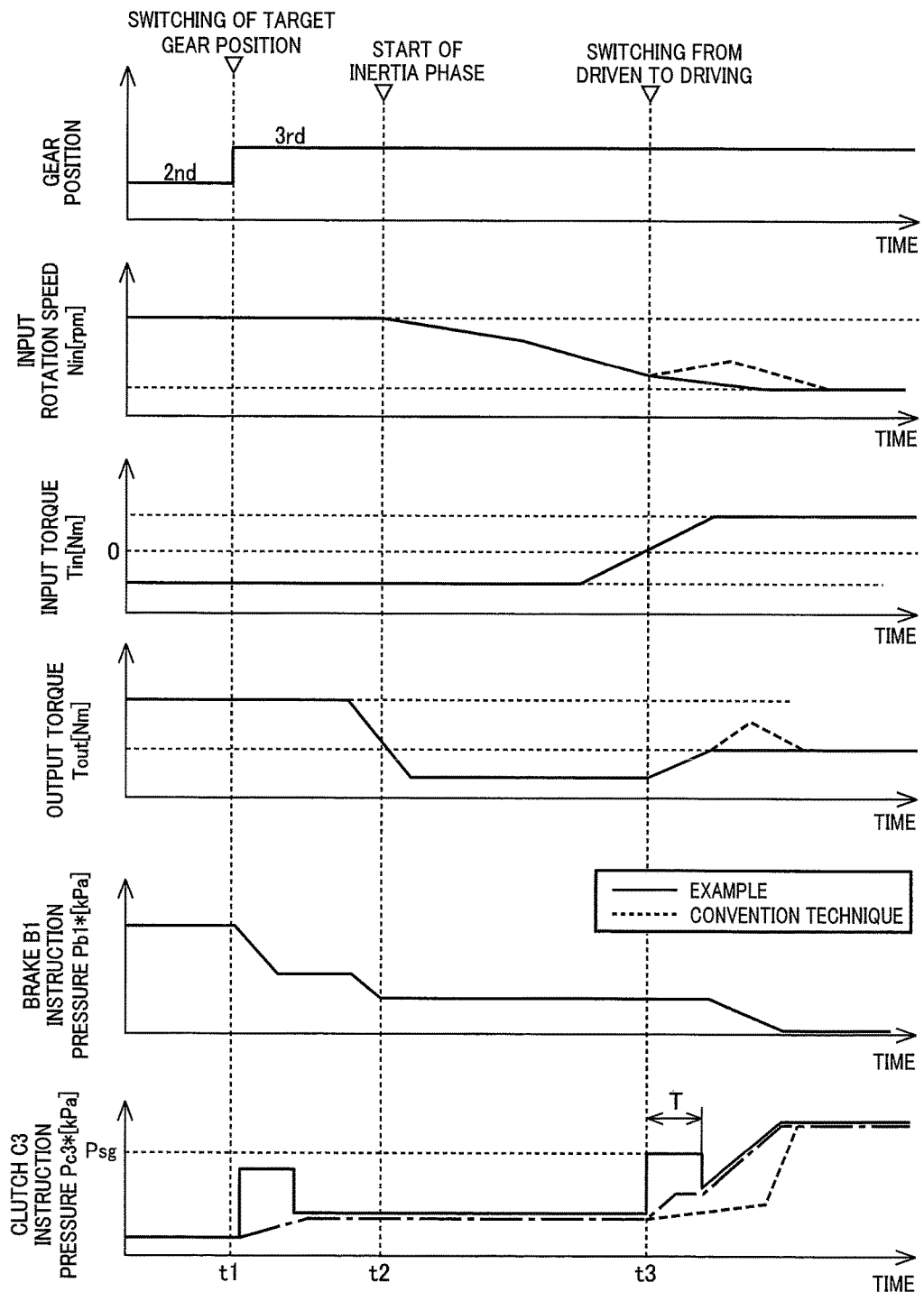
FIG. 11 is a time chart of an operation result when switching to a driving upshift is performed during a driven upshift in which a gear position is shifted from the second speed gear position to the third speed gear position.

FIG. 11 is a time chart of a vehicle state at the time of switching to the driving upshift during the driven upshift (during the inertia phase) from the second speed gear position 2nd to the third speed gear position 3rd. For example, when the upshift from the second speed gear position 2nd to the third speed gear position 3rd is determined at time t1 during coasting at the second speed gear position 2nd (during running with the accelerator pedal turned off), the clutch-to-clutch control is started for engaging the third clutch C3 and releasing the first brake B1.

Describing the control after time t1, the instruction pressure Pb1* of the first brake B1 corresponding to the release-side engagement device is reduced to a predetermined pressure set in advance, is temporarily maintained at the predetermined pressure, and is then further reduced to a preset standby pressure at which the torque capacity of the first brake B1 becomes a predetermined value (time t1 to time t2). On the other hand, in the third clutch C3 corresponding to the engagement-side engagement device, the determination of the upshift at time t1 leads to execution of the quick fill temporarily increasing the instruction pressure Pc3* to a predetermined pressure set in advance so as to enhance the responsiveness of the engagement hydraulic pressure Pc3. The completion of the quick fill is followed by waiting at a standby pressure set in advance (time t1 to time t2).

When the inertia phase is started at time t2, the input rotation speed Nin starts decreasing. At this point, the input rotation speed Nin is controlled by the first brake B1. Specifically, a feedback control is provided by calculating and outputting a feedback control amount, i.e., the instruction pressure Pb1* of the first brake B1, by using a difference (=Nin*−Nin) between the target input rotation speed Nin* and the input rotation speed Nin as the deviation ΔNin such that the input rotation speed Nin is gradually reduced toward the target input rotation speed Nin* calculated from a speed change ratio γ3 of the third speed gear position 3rd, which is the gear position after the shift, and the output rotation speed Nout (time t2 to time t3).

When the accelerator pedal is depressed during the inertia phase between time t2 and time t3, the input torque Tin is increased, and the input torque Tin becomes zero at time t3. At this point, the input torque Tin applied to the input shaft 32 is switched from a negative value to a positive value. When the input torque Tin is switched to a positive value, the rotation speed control of the input rotation speed Nin is switched to the control by the third clutch C3 that is the engagement-side engagement device.

In this case, it is necessary to promptly ensure a torque capacity enabling the provision of the rotation speed control in the third clutch C3, and if the instruction pressure Pc3* of the third clutch C3 is less than the piston stroke end pressure Pend, the space between the piston 42 and the friction engagement element 44 must promptly be eliminated. In this regard, in this example, when it is determined at time t3 that switching is performed from the driven state to the driving state, the hydraulic pressure surge control portion 80 is executed to set the target surge pressure Psg and the target surge time T as the instruction pressure Pc3* of the third clutch C3, and the pressure is increased to the target surge pressure Psg for the target surge time T as indicated by a solid line. Therefore, the space between the piston 42 and the friction engagement element 44 of the third clutch C3 is promptly eliminated, and the responsiveness of the engagement hydraulic pressure Pc3 (actual hydraulic pressure) indicated by a dashed-dotted line is improved as compared to the engagement hydraulic pressure Pc3 (actual hydraulic pressure) without the output of the target surge pressure Psg (conventional technique) indicated by a broken line. Thus, the torque capacity required for the rotation speed control of the input rotation speed Nin is promptly ensured. When the output time of the target surge pressure Psg reaches the target surge time T, the normal feedback control is restored.

As described above, since the space between the piston 42 and the friction engagement element 44 of the third clutch C3 is promptly eliminated by outputting the target surge pressure Psg at time t3 and the responsiveness of the hydraulic pressure is improved, the rise in the torque capacity of the third clutch C3 is advanced, and the torque capacity required for the rotation speed control by the third clutch C3 can promptly be achieved. Additionally, since the third clutch C3 quickly ensures the torque capacity required for the rotation speed control, the racing of the input rotation speed Nin conventionally generated as indicated by a broken line is prevented. Additionally, because of the suppression of variation in the output torque Tout as indicated by a broken line conventionally generated due to the racing, the shock is restrained. Although the upshift from the second speed gear position 2nd to the third speed gear position 3rd is described as an example in the above description, the same control is provided even in an upshift to other gear shift positions.

Figure 12:
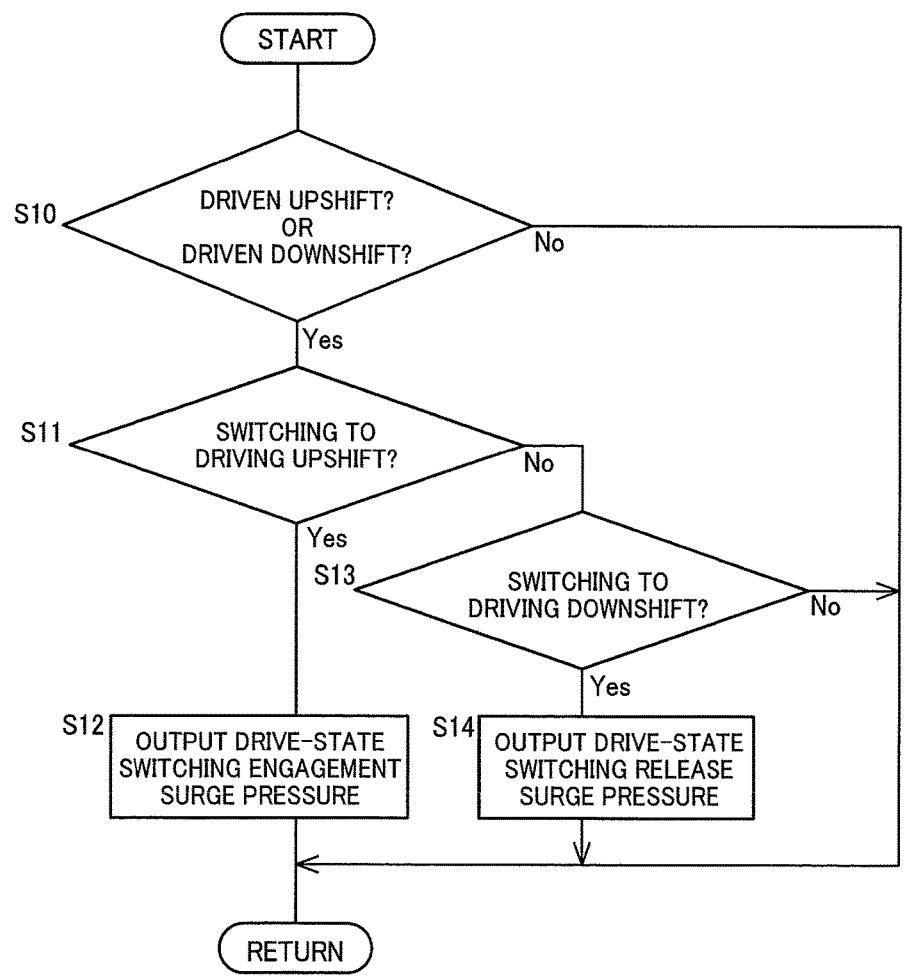
FIG. 12 is a flowchart for explaining a main portion of the control function of an electronic control device, i.e. the control operation at the time of switching from "driven" to "driving" during the driven upshift or the driven downshift.

FIG. 12 is a flowchart for explaining a main portion of the control function of the electronic control device 70, i.e. the control operation at the time of switching from the driven state to the driving state during the driven upshift or the driven downshift (during the inertia phase). This flowchart is repeatedly executed during running of the vehicle.

First, at step S10 (hereinafter, step is omitted) corresponding to the control function of the shift determining portion 76, it is determined whether the automatic transmission 22 is in process of a driven upshift or a driven downshift. In the case of neither the driven upshift nor the driven downshift, S10 is negative and the operation is returned. In the case where the automatic transmission 22 is in process of the driven upshift or the driven downshift, S10 is affirmative and the operation goes to S11.

At S11 corresponding to the control function of the drive switching determining portion 78, it is determined whether switching to the driving upshift is performed. In the case of switching to the driving upshift due to, for example, depression of the accelerator pedal, S11 is affirmative and the operation goes to S12. At S12 corresponding to the control function of the hydraulic pressure surge control portion 80, the target surge pressure Psg and the target surge time T are set based on the target torque Te* and the piston return time Trt, and the target surge pressure Psg is output (increased) for the target surge time T in the engagement-side engagement device.

Returning to S11, in the case of the driven upshift or the driven downshift, S11 is negative and the operation goes to S13. At S13 corresponding to the control function of the drive switching determining portion 78, it is determined whether switching to the driving downshift is performed. In the case of switching to the driving downshift, S13 is affirmative and the operation goes to S14. At S14 corresponding to the control function of the hydraulic pressure surge control portion 80, the target surge pressure Psg and the target surge time T are set based on the target torque Te* and the piston return time Trt, and the target surge pressure Psg is output (increased) for the target surge time T in the release-side engagement device. Returning to S13, in the case of the driven downshift or the driven upshift, S13 is negative and the operation is returned.

As described above, according to this example, when switching to the driving state is performed during the upshift in the driven state, the input rotation speed Nin of the input shaft 32 of the automatic transmission 22 is controlled by the engagement-side engagement device to be engaged during the shift and, in this case, the instruction pressure of the engagement-side engagement device is increased to the target surge pressure Psg for the target surge time T, so that the responsiveness of the engagement-side engagement device is enhanced. Additionally, when switching to the driving state is performed during the downshift in the driven state, the input rotation speed Nin of the input shaft 32 of the automatic transmission 22 is controlled by the release-side engagement device to be released during the shift and, in this case, the instruction pressure of the release-side engagement device is increased to the target surge pressure Psg for the target surge time T, so that the responsiveness of this release-side engagement device is enhanced. This enables the suppression of the racing of the rotation speed of the input shaft 32 and the shock due to the response delay of the engagement device.

According to this example, since the magnitude of the target surge pressure Psg and the target surge time T are set based on the target torque Te* of the engine 12, the target surge pressure Psg and the target surge time T are set to optimum values and the occurrence of the excessive surge pressure can be suppressed while ensuring the responsiveness of the engagement device.

According to this example, since the piston stroke end attainment degree S is estimated based on the piston return time Trt, and the target surge pressure Psg and the target surge time T are adjusted based on the hydraulic pressure required for achieving a state in which the space is eliminated between the piston 42 and the engagement element 44 from this attainment degree S, the responsiveness of the engagement device can further be enhanced.

Although the example of the present invention has been described in detail with reference to the drawings, the present invention can be also applied in other forms.

For example, although the automatic transmission 22 is an automatic transmission having eight forward speeds in the example described above, the present invention is not particularly limited in terms of the number of gear shift positions and the coupling relationship (structure) of the automatic transmission. In this context, the engagement-side engagement device to be engaged during the downshift and the release-side engagement device to be released during the downshift are appropriately changed depending on the structure and the gear shift position of the automatic transmission. Similarly, the engagement-side engagement device to be engaged during the upshift and the release-side engagement device to be released during the upshift are appropriately changed depending on the structure and the gear shift position of the automatic transmission.

Although the target surge pressure Psg and the target surge time T are set based on the target torque Te* and the piston return time Trt in the example described above, the oil temperature THoil of the hydraulic fluid related to the responsiveness of the hydraulic pressure may be taken into consideration.

Although the target surge time T is corrected based on the piston return time Trt in the example described above, the target surge pressure Psg may also be corrected based on the piston return time Trt.

Although the forms of switching from the driven downshift to the driving downshift and from the driven upshift to the driving upshift are described in the example described above, the present invention may be applied to the case of switching from the driven downshift to the driving upshift and the case of switching from the driven upshift to the driving downshift. For example, during the driven downshift, switching to the driving upshift may be performed by a manual operation (shift operation) by a driver. In such a case, the engagement device serving to control the input rotation speed Nin is changed. In this case, by outputting a surge pressure (instruction pressure) to the engagement device so as to increase the responsiveness of the engagement device serving to control the input rotation speed Nin, the responsiveness is enhanced so that the racing of the rotation speed of the input shaft 32 and the shock can be suppressed. As described above, even in the case of switching to the driving upshift during the driven upshift or to the driving upshift during the driven downshift, the same effect as the example described above can be acquired by outputting the surge pressure to the engagement device controlling the input rotation speed Nin.

The above description is merely an embodiment and the present invention can be implemented in variously modified and improved forms based on the knowledge of those skilled in the art.

REFERENCE SIGNS LIST

- 10: Vehicle
- 12: Engine (Motor)
- 22: Automatic transmission
- 42: Piston
- 44: Friction engagement element (Engagement element)
- 70: Electronic control device (Control device)
- 74: Shift control portion
- 80: Hydraulic pressure surge control portion
- C1 to C4: First clutch to Fourth clutch (Engagement device)
- B1, B2: First brake, second brake (Engagement device)

What is claimed is:

1. A control device of a vehicle including a motor and a multi-speed automatic transmission that includes a plurality of engagement devices, the automatic transmission configured to be shifted to a plurality of gear positions by switching an engagement state of the plurality of engagement devices, the control device comprising:
   a shift control portion configured (i) to engage an engagement-side engagement device that is one of the engagement devices that is to be engaged during a shift and (ii) to release a release-side engagement device that is one of the engagement devices that is to be released during the shift when the shift to a predetermined gear position is determined,
   the shift control portion configured to control an engagement hydraulic pressure of either the release-side engagement device or of the engagement-side engagement device depending on whether the shift is an upshift or a downshift, so that (1) the engagement hydraulic pressure of the release-side engagement device is controlled to control a rotation speed of a rotating element of the automatic transmission when the shift is the upshift in a driven state in which a drive torque is not output from the motor, (2) the engagement hydraulic pressure of the engagement-side engagement device is controlled to control the rotation speed of the rotating element of the automatic transmission when the shift is the upshift in a driving state in which the drive torque is output from the motor, (3) the engagement hydraulic pressure of the engagement-side engagement device is controlled to control the rotation speed of the rotating element of the automatic transmission when the shift is the downshift in the driven state in which the drive torque is not output from the motor, and (4) the engagement hydraulic pressure of the release-side engagement device is controlled to control the rotation speed of the rotating element of the automatic transmission when the shift is the downshift in the driving state in which the drive torque is output from the motor, and
   a hydraulic pressure surge control portion configured to increase an instruction pressure of the engagement hydraulic pressure that is controlled by the shift control portion to a predetermined target surge pressure for a target surge time when switching is performed during the upshift of the automatic transmission in the driven state in which the drive torque is not output from the motor, to the driving state in which the drive torque is output from the motor,
   the hydraulic pressure surge control portion configured to increase the instruction pressure of the engagement hydraulic pressure to the predetermined target surge pressure for the target surge time when switching is performed during the downshift of the automatic transmission in the driven state in which the drive torque is not output from the motor, to the driving state in which the drive torque is output from the motor.

2. The control apparatus according to claim 1, wherein a magnitude of the target surge pressure and the target surge time are set based on a target torque of the motor.

3. The control apparatus according to claim 1, wherein the target surge time is adjusted based on a piston stroke end attainment degree estimated based on a first time during which the instruction pressure is less than a preset piston stroke end pressure at which a space is eliminated between a piston and an engagement element of one of the engagement devices that is having its engagement hydraulic pressure controlled by the hydraulic pressure surge control portion, and a second time during which the instruction pressure is equal to or greater than the preset piston stroke end pressure.

* * * * *